United States Patent [19]
de Fries

[11] Patent Number: 5,163,478
[45] Date of Patent: Nov. 17, 1992

[54] SPOOL VALVE HAVING IMPROVED SEALING CHARACTERISTICS

[75] Inventor: Jan R. de Fries, Wallisellen, Switzerland

[73] Assignee: Festo KG, Esslingern, Fed. Rep. of Germany

[21] Appl. No.: 750,961

[22] Filed: Aug. 28, 1991

[30] Foreign Application Priority Data

Aug. 31, 1990 [DE] Fed. Rep. of Germany ....... 4027610

[51] Int. Cl.⁵ ............................................. F15B 13/042
[52] U.S. Cl. .......................... 137/625.66; 137/625.25; 251/167; 251/172; 251/174; 251/175
[58] Field of Search .................. 137/625.25, 625.66; 251/159, 167, 172, 174, 175, 176

[56] References Cited

U.S. PATENT DOCUMENTS

| | | |
|---|---|---|
| 2,743,900 | 5/1956 | Holzer et al. ........................ 251/174 |
| 2,858,851 | 11/1958 | Holl . |
| 3,215,163 | 11/1965 | Henderson . |
| 3,329,168 | 7/1967 | Vollmer ............................ 251/175 X |
| 3,349,800 | 10/1967 | Herion et al. .................... 137/625.66 |
| 3,463,192 | 8/1969 | Herion ........................ 137/625.25 X |
| 3,580,542 | 5/1971 | Wright ............................. 251/175 X |
| 3,595,274 | 7/1971 | Faisandier ...................... 137/625.25 |
| 3,776,276 | 12/1973 | Stiltner ............................. 251/175 X |
| 3,959,024 | 5/1976 | Kirk et al. ....................... 137/625.25 |
| 4,136,853 | 1/1979 | Johansson et al. ......... 137/625.25 X |
| 4,548,238 | 10/1985 | Chorkey .......................... 137/625.25 |
| 4,825,907 | 5/1989 | Johnson et al. ................ 137/625.25 |

FOREIGN PATENT DOCUMENTS

| | | |
|---|---|---|
| 2047888 | 5/1971 | Fed. Rep. of Germany . |
| 2606475 | 9/1976 | Fed. Rep. of Germany . |
| 3446384 | 6/1985 | Fed. Rep. of Germany . |

*Primary Examiner*—Gerald A. Michalsky
*Attorney, Agent, or Firm*—Hoffmann & Baron

[57] ABSTRACT

A valve whose housing has valve spool receiving means arranged in it so that the spool is able to move between two switching positions reciprocatingly and is able to connect valve ducts in the housing with each other for the passage of fluid. For this purpose it has window-like transversely extending passages, through which the fluid may flow between two valve ducts. While offering a low resistance to flow the valve design leads to large orifices. Special means are provided for sealing and the control of frictional forces during operation.

14 Claims, 3 Drawing Sheets

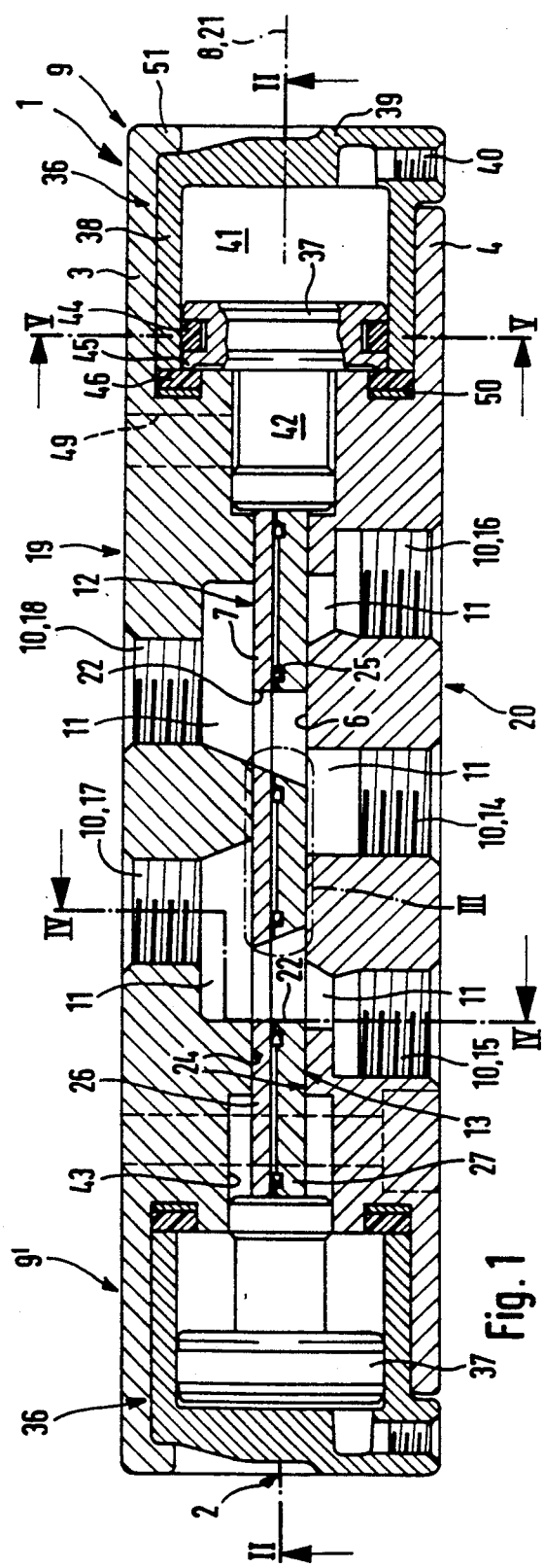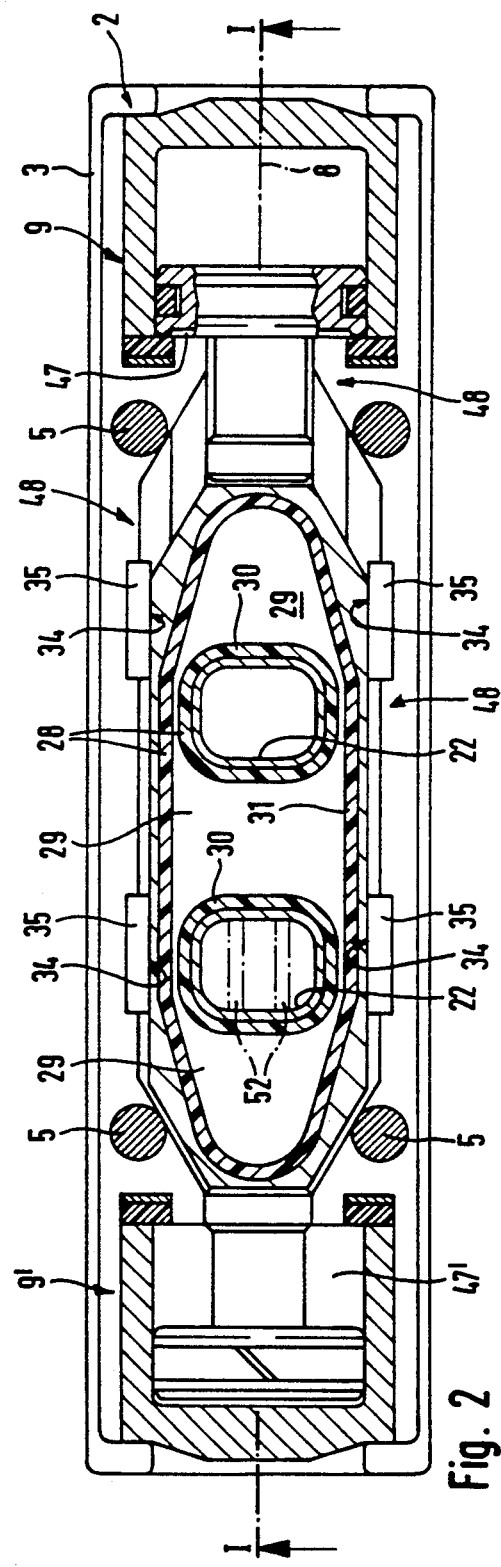
Fig. 1
Fig. 2

SPOOL VALVE HAVING IMPROVED SEALING CHARACTERISTICS

BACKGROUND OF THE INVENTION

The invention relates to a valve comprising valve housing, which contains a spool receiving means, which has lateral ports each consisting of an inlet and an outlet opening for a fluid power medium, more particularly a pneumatic one, and in which a valve spool is arranged so that it may be reciprocated between at least two switching positions and with the agency of at least one control recess is able to change a fluid power connection between individual inlet and outlet openings.

Such valves, which are also referred to as spool valves, have so far only been manufactured in two basic designs. In this respect it is a question on the one hand of round spool valves with a substantially cylindrical spool or, respectively, piston and on the other hand of flat spool valves with a flat or plate-like spool. A point in common to the two designs is the presence of control recesses cut into the surface of the spool, which in the correct position of switching render possible the flow of the fluid. However the design with the round spool has a comparatively poor hydrodynamic performance, while in the case of flat spool valves the orifices or flow cross sections are comparatively restricted. This latter disadvantage is more particularly due to the standard specifications as regards the placing of the valve fastening means.

SHORT SUMMARY OF THE PRESENT INVENTION

Accordingly one object of the invention is to provide a valve of the type initially mentioned which makes possible extremely favorable flow conditions. A still further object of the invention is to provide a valve with a large orifice, i.e. with large cross sections.

In order to achieve these or other objects appearing in the present specification, claims and figures, the ports adjacent to the spool receiving means, for the respective supply and return openings, which are provided for mutual fluid power connection, are associated with respectively opposite longitudinal sides of the valve spool and the control recesses present are constituted by passages in the spool, which penetrate the spool transversely in relation to its direction of displacement and open on the two longitudinal sides in such a manner that the valve spool is traversed by fluid moving between a supply opening and a discharge opening.

It is in this manner that it is possible to provide a very compact valve offering only a minimum resistance to the medium flowing through it. The changes in direction of the medium on passing through the spool are restricted as far as possible. Furthermore it is possible for the valve spool to be designed with comparatively large passages therein, this increasing the orifice without the overall size of the valve having to be increased. Therefore, all in all the result is a valve whose spool has window-like openings so that the distance traveled by the fluid through it is comparatively short as well. Furthermore by a suitable design and arrangement of the passages through the spool and of the openings, it is possible to arrive at a configuration in the case of which the one of the two surfaces of the spool on the side thereof adjacent to the ports never runs over the edge of a port, this being something that significantly reduces wear and owing to resulting reduction of flexure makes possible the use of spools with smaller cross sectional dimensions.

Further developments and features of the invention are recited in the claims.

In this respect a particular advantage is provided by a design in which the two spool surfaces, which are turned towards ports in the spool receiving means, and the housing support surface facing the said two surfaces are able to be urged together by at least loading means, more particularly with a self-adjusting function. This stabilizes the position of the spool in the valve housing and always ensures optimum sealing contact between the valve spool and the valve housing. Given a precise finish on the surface of the spool and on the housing serving for sealing, for instance by lapping, it is possible in this manner to do without an additional synthetic resin sealing means. A particularly even loading action which thus ensures a high seal quality and free running of the spool is to be obtained if the loading means is a fluid, which is preferably compressed air, the valve furthermore preferably being in the form of a compressed air valve. The fluid pressing the spool surfaces onto the housing in contact with each other leads to a snug engagement of the contact surfaces. In this respect a particularly convenient design is one involving the use of a tabular spool consisting of two plate-like spool halves resting on each other and between which at least one fluid space is provided, which may be put under pressure by the fluid acting as the loading means. This fluid space is preferably laterally sealed off by sealing elements or sealing masks arranged between the spool elements which simultaneously may effect a setting of the relative axial position of the two spool elements.

The fluid functioning as the loading means may be fed in separately, it more particularly taking effect independently of the respective position of the spool in the fluid space. However it is preferred to have a design in which the fluid loading means is tapped from the working medium, that is to say from the fluid flowing in the supply and/or discharge openings. This system offers the advantage that the loading force or, respectively, the loading pressure is automatically varied as a function of the pressure of the working medium and one may be certain of a constant satisfactory centering of the valve spool in the spool receiving space.

It is convenient if the supply of the fluid into the fluid space takes place via a check valve arrangement and thus is effectively sealed off in idle periods as well. In order to favor speed of operation on switching over the valve it is however possible to provide an override device, which when the valve is switched over effects a short venting of the fluid space so that the necessary operating force is reduced.

The invention will now be described in more detail with reference to the accompanying drawings, which show several working embodiments thereof.

LIST OF THE SEVERAL VIEWS OF THE FIGURES

FIG. 1 shows a first basic configuration of the valve in accordance with the invention in a longitudinal section taken on the line I—I of FIG. 2.

FIG. 2 shows the valve illustrated in FIG. 1 in longitudinal section adjacent to a parting plane of the housing, taken on the section II—II.

FIG. 8 and

Figure 8:
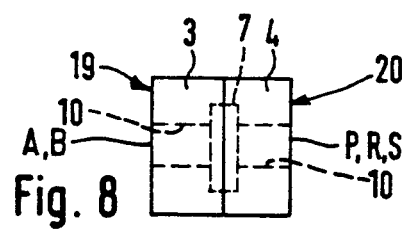
Figure 9:
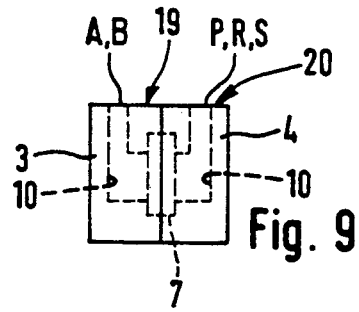

FIG. 9 show in a diagrammatic view and in an end-on view different possibilities as regards the arrangement of the valve ducts, FIG. 8 showing a design in which the working side and the supply/discharge sides are opposite to each other, whereas FIG. 9 shows a valve with a coincident working and supply/discharge sides on a single surface.

Figure 10:
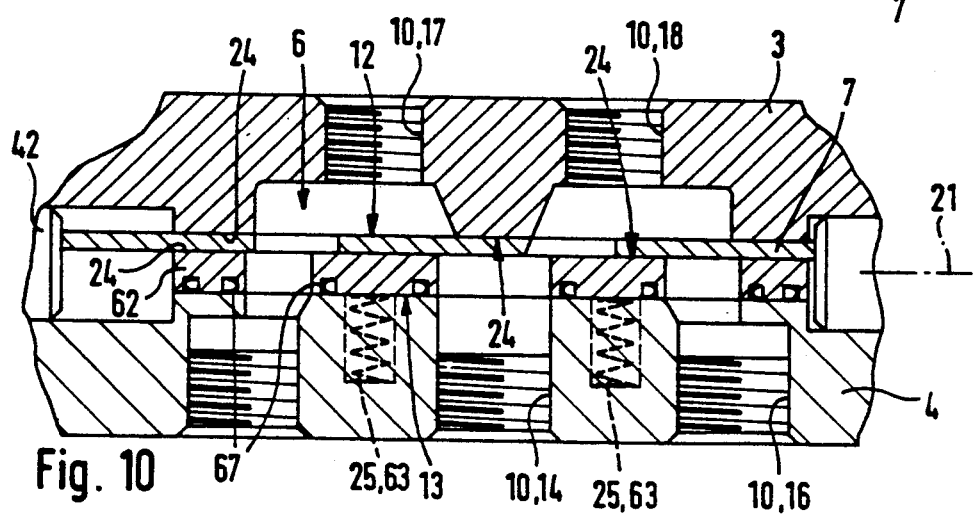

FIG. 10 shows a further modified embodiment of the valve with a different way of loading the valve spool and valve housing into engagement with each other.

DETAILED ACCOUNT OF WORKING EMBODIMENTS OF THE INVENTION

The valve illustrated in FIGS. 1 through 5 possesses two housing parts 3 and 4 put together at a parting plane or point of splitting 2 to form a longitudinally divided valve housing 1. The housing parts 3 and 4 are constituted by two housing halves in this embodiment of the invention and may for instance be permanently joined together by laser welding. It is however convenient to have a design able to be taken apart, which in this case is made possible by the four screws 5 clamping the housing parts 3 and 4 together in the transverse direction.

In the interior of the valve housing 1 there is a spool receiving means 6. The receiving means as well is divided by the parting plane 2 into two receiving means halves, which are constituted by recesses in the housing. In the spool receiving means 6 a valve spool 7 is accommodated so that it is able to reciprocate in the longitudinal direction 8 of the valve. An actuating device 9 and 9', respectively adjoins the valve spool receiving means 6 at each end and is best placed in the valve housing 1. To the side and adjacent to the spool receiving means 6 the valve housing 1 has a plurality of valve ducts 10, which constitute the supply and the discharge openings for a pneumatic fluid and communicate with the valve spool receiving means 6 via ports provided on the side of the latter.

The valve spool 7 is flat and in the form of a plate or rail, its main center plane extending in the parting plane 2 or parallel to and offset from it. It is in this manner that the two oppositely positioned valve spool surfaces 12 and 13 with a large area are held turned towards one of the two housing parts 3 and 4 and are opposite to the ports 11 of the valve ducts formed therein.

In the case of the valve illustrated in FIGS. 1 through 5 it is a question of a pneumatically operated 5-2 way spool valve. The housing part 4 shown in the lower part of FIG. 1 has in this case three valve through ducts 10 and placed in relative succession to each other in the longitudinal direction 8, two venting ducts (R and S) 15 and 16 being positioned on each side of a feed duct (P) 14. The housing part 3 at the top in FIG. 1 has two valve ducts 10 placed in succession in the longitudinal direction 8, which function as power ducts (A and B) 17 and 18. The latter open on one working side 19 of the valve on the outer side, which is remote from the parting plane 2, of the associated housing part 3 and make possible the connection of duct or lines, not illustrated, leading to loads. The previously explained valve ducts 10, 14, 15 and 16 open at the opposite outer side of the valve, where it is also possible for lines or ducts leading to external devices to be connected, and which supply the power fluid to the supply duct 14 and, if no direct venting into the surroundings is intended, lead away the spent air from the venting ducts. The corresponding valve side is in what follows referred to as the supply/discharge side 20.

The design as so far described above with the working supply/discharge sides 19 and 20 on opposite valve sides is diagrammatically shown in FIG. 8 again. However it will be clear from FIG. 9 that these sides 19 and 20 may if desired be other sides of the valve. In FIG. 9 these sides 19 and 20 are for instance in the form of a single outer side of the valve, the course of the valve ducts 10 however being bent.

In the case of the valve illustrated in FIGS. 1 through 5 the valve spool 7 is able to be moved between two switching positions. Dependent on the switching position some of the individual valve ducts are connected with each other fluid powerwise, while simultaneously other valve ducts are separated from each other. In the first switching position illustrated in FIG. 1 there is a fluid power connection via the valve spool 7 between the feed duct 14 and the second power duct 18, and simultaneously the first power duct 17 connected with the first venting duct 15 and the second venting duct 16 is shut off. In the second switching position, which is not illustrated, the connections are reversed, the first power duct 17 being supplied with fluid power medium, while the second power duct 18 is vented via the second venting duct 16. It is in such a manner that for instance a reciprocating movement of a piston and cylinder unit may be caused.

In order to produce a fluid power connection between individual valve ducts 10, the valve spool 7 has a plurality of control recesses, which are in the form of passages 22 in the valve spool extending completely through it in a direction perpendicular to its direction 21 of operation in the longitudinal direction 8. These passages run into the valve spool surfaces 12 and 13, respectively, and into the valve spool receiving means sections having the port 11. The consequence of this is that the valve spool 7 has the fluid flowing through it in a direction perpendicularly to its main center plane between two valve ducts 10. This is made clear by the flow arrow 23 indicating the direction of the flow in FIG. 4. Which of the valve ducts 10 constitutes a supply or, respectively, discharge opening is dependent on the position of switch of the valve spool and the pressure level in the ducts.

It will be clear that the number of the valve spool passages 22 present will be selected in accordance with the respective valve type. In the case of there being a plurality of such passages 22 in the valve spool there will be an arrangement of the same in sequence in the direction 21 of operation: the illustrated valve has two of them.

As seen looking in the direction of one of the valve spool surfaces 12 and 13 the passages 22 in the valve spool 7 take the form of ports like windows in the valve spool 7 and having means surrounding them. They offer a relatively large flow orifice in relation to the breadth of the valve and permit flow therethrough without much resistance. The change in the direction of flow between two valve ducts 10 is minimum.

The valve spool design in accordance with the invention has an advantage with respect to the length of life of any sealing surfaces or sealing elements. It will be seen from FIG. 1 that the passages 22 in the valve spool and the duct ports 11 associated with one of the valve spool surfaces 12 adjacent thereto may be so matched in relation to each other that the edges of the openings do not at any time run over edges on the housing. Adjacent to the valve spool surface 12 the ports 11 are for this purpose designed so as to widen towards the valve spool 7, while the passages 22 in the valve spool become narrower towards the surface 12 of the valve spool.

In order to provide an exact transverse fit of the valve spool 7 in the spool receiving means 6 and ensure precision running without the danger of seizing and with an optimum sealing action, the two valve spool surfaces 12 and 13 and the support surfaces 24, which are respectively turned towards them, are able to be loaded and pressed against each other. The support surfaces 24 in this case constitute sliding or plain bearing surfaces at the same time for the guiding effect on the valve spool 7. In this respect the two housing parts 3 are fixedly set together adjacent to the parting plane 2 and for the loading action at least one loading means 25 is responsible, which supplies the necessary loading force. The loading force is preferably self-adjusting so that the valve spool 7 automatically adapts itself to the cross section of the spool receiving means 6 and, respectively, makes snug engagement therewith and furthermore ensures that any wear taking place in operation is automatically compensated for. Furthermore this design renders possible the use of comparatively hard materials which are in engagement with each other to constitute a seal in the part between the valve spool 7 and the spool receiving means 6; furthermore a design completely without any seal at all would be possible. The reason for this is that the loading means does not function adjacent to the spool surfaces 12 and 13 but at another position. The part between the spool surfaces 12 and 13 and the supporting surfaces 24 is therefore free of loading means and thus able to be very exactly machined so as to produce a superior sealing effect. For instance, it is possible to use a metal spool, which has been precision machined by lapping, metal seals being able to be used.

In the case of the valve illustrated in FIGS. 1 through 5 a fluid is provided as the loading means, such fluid being drawn from the fluid power medium of the valve, that is to say from at least one of the valve ducts 10. For this purpose the valve spool 7 is made in two parts and comprises two plate-like spool elements 26 and 27 which are positioned transversely in relation to the direction of shift alongside or on top of each other. Between the same there is during operation of the loading system the loading means 25 which is more particularly constituted by compressed air, while the mutually opposite sides of the spool element constitute the two spool surfaces 12 and 13.

It may more particularly be seen from FIG. 2 that between the two spool elements 26 and 27 a seal arrangement 28 is positioned which has one or more parts and which together with the two spool elements 26 and 27 delimits at least one fluid space 29.

The seal arrangement 28 has, for each opening 22 in the spool, an inner seal element 30 and 30 which is closed in the form of a ring and extends along the edge of the respective opening 22 in the valve spool. There is furthermore a further external seal element 31, which constitutes a ring and which is associated with the edge part of the valve spool 7 and extends around all inner seal elements 30. The result is a coherent fluid space 29 between the inner and outer seal elements 30 and 31 which may occupy practically the entire area in the intermediate part between the spool elements 26 and 27. All the seal elements may be connected together as an integral sealing mask.

The two valve spool elements 26 and 27 may be loosely positioned on top of each other with the intermediate seal arrangement 28 between them, it however being possible to provide means which prevent relative movement between the two valve spool elements 26 and 27 in the parting plane thereof. Such means are for instance transverse pins or they may be constituted directly by at least one part of the seal arrangement 28 by having the same arranged in recesses in the two valve spool elements 26 and 27 or having projecting parts locking into it. The latter arrangement is used in the embodiment of the invention.

Figure 3:
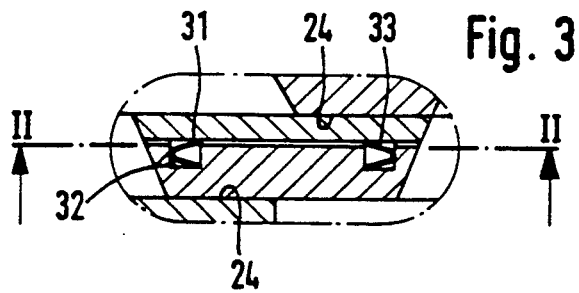
FIG. 3 shows the valve on a larger scale in the part III indicated in FIG. 1.

It will be seen from FIGS. 1 and 3 that at least one of the two valve spool elements 27 as part of the seal arrangement 28 has corresponding groove-like depressions 32 on the parting surface turned towards the other spool element 26, the seal arrangement 28 being positioned in such depressions 32. The seal arrangement 28 is able to be bent elastically in a direction perpendicular to the median plane of the spool so that even if there is a change in the distance between the two valve spool elements 26 and 27 it simultaneously makes sealing engagement with both of them. A preferred feature is that the sealing elements 30 and 31 are fitted with a fluid power check valve function in such a manner that they permit a flow of the fluid power medium into the fluid space 29, while they prevent or at least impede a flow in the opposite direction. In the illustrated working embodiment this check valve function is produced because lip seal rings are employed as seal elements, which have at least one check valve sealing lip 33. For instance the sealing elements 30 and 31 have a substantially U-like or V-like cross section, the well of the U or of the V being turned towards the fluid space 29 and one of the respective limbs constitutes the check valve sealing lip 33.

It is in such a manner that during operation of the valve fluid power medium flowing in the valve ducts 10 is able to flow into the fluid space 29 in the part adjacent to the parting plane between the two spool elements 26 and 27 while overriding the sealing arrangement 28. This offers the advantage that the pressure obtaining in the fluid space varies in accordance with the pressure of the working medium, for instance proportionally thereto. Consequently the loading effect between the spool surfaces 12 and 13 and the support surfaces 24 will vary in accordance with the operational pressure, this meaning that there is always an optimum control and guidance of the valve spool 7 to make snug engagement. Furthermore, the supply of the loading means into the fluid space is independent of the position of the valve spool.

It will be clear that the loading fluid is furthermore able to be supplied via a suitable duct in the valve spool into the fluid space 29, in which respect there is then furthermore an advantage to be gained if the respective duct cooperates with a check valve arrangement having the action mentioned above. Furthermore it is possible naturally for the supply of the loading means 25 to be separate and independent from the working medium in the valve, for instance as derived from one of the actuating devices 9 and 9' or using a special separate fluid power medium supply.

Figure 4:
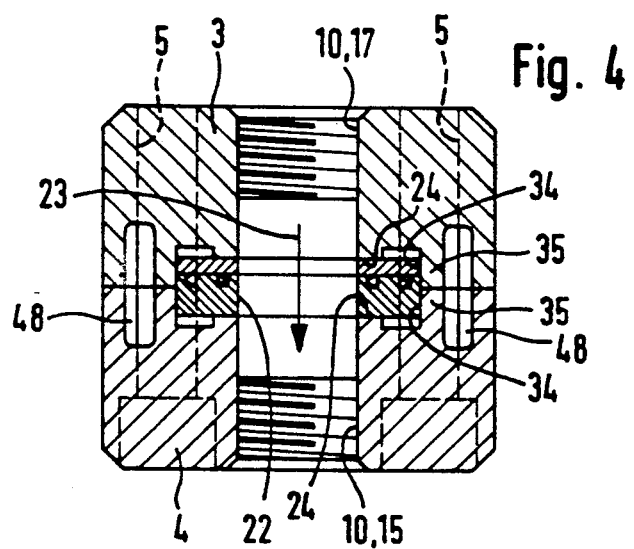
FIG. 4 shows a cross section taken through the valve on the stepped section line IV—IV of FIG. 1.
Figure 5:
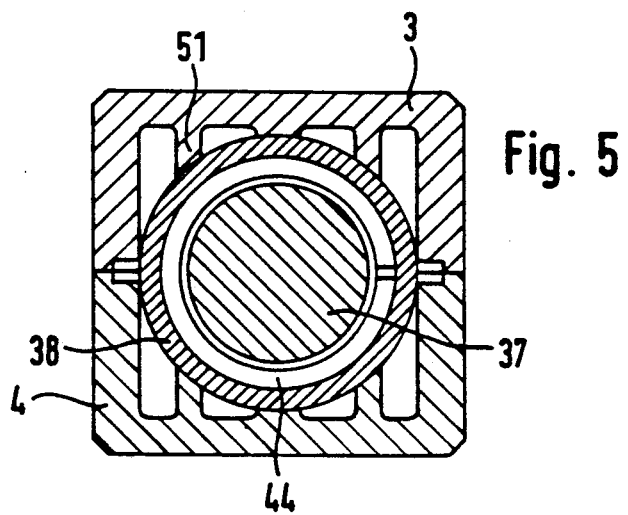
FIG. 5 shows a cross section taken through the valve adjacent to an end actuating cylinder on the section line V—V of FIG. 1.

More particularly in the illustrated working embodiment of FIGS. 2 and 4 it is clear that the valve spool 7 is also guided marginally, that is to say along its narrow longitudinal edge for the sliding action. For this purpose there are suitable guiding surface 34 provided on the housing, which may be constituted by guide heads 35, arranged in opposite pairs, or guide ribs on the two housing parts 3 and 4.

As shown in FIGS. 1, 3 and 4, it is possible for the spool element 26, which has a passage opening operating without overlap, to be made thinner, owing to lower resistance bending, than the second valve spool element 27. However independently of this the passage 22 in the spool consists of passage sections which are arranged consecutively transversely in relation to the direction 21 of shifting, and associated with the individual element.

The two actuating devices 9 and 9' mentioned above are identical in construction in the embodiment of the invention illustrated in FIGS. 1 through 5 and respectively consist of an actuating cylinder 36, which is integrated or installed in the valve housing 1, and in the cylinder a reciprocating actuating piston 37 is arranged. Owing to the identical design the present description will be restricted to one of the actuating devices 9. It is naturally furthermore possible to combine different actuating device in each valve, it being furthermore possible for one actuating device to comprise a return spring means.

The actuating cylinder 36 consists of a cylindrical guide part 38 which is mounted at one end between the two housing parts 3 and 4 and in which the reciprocating piston 37 is arranged and at the end remote from the spool 7 it is shut off by an end cover which is more particularly in the form of an integral plate 39. It is in this manner that there is a generally cap-like terminating part, which furthermore has a connection opening 40 in order to supply the actuating fluid to the cylinder space 41 adjacent to the side of the piston which is remote from the spool. The piston 37 is comparatively narrow in the axial direction, since it has a projecting guiding head 42 extending towards the valve spool 7 and which runs in a guiding recess 43 communicating with the spool receiving means 6 or, respectively, constituting a part thereof.

Independently of this a further significant advantage of the actuating devices 9 and 9' is that circumferentially between the piston 37 and the guide part 38 it is possible to do without any soft elastic seal, for which reason in the embodiment of the invention there is in this part only a piston ring consisting of, for instance, hard synthetic resin, or a sliding ring 44. In place of this the actuating piston 37 has, at its side facing the spool 7, an axially projecting annular head 45, which is axially opposite to a sealing ring 46 arranged on the housing. When the actuating piston 37 has reached the end of its stroke near to the opposite actuating device 9', in which respect it will have moved the valve spool 7 into its first position of switching, the annular head 45 will cooperate with the sealing ring 46, into which it is able to bite in the case of the use of elastic material. Since the guide part 38 also provides a sealing action with respect to the outside, for instance owing to sealing ring 46, at the said end of stroke position the cylinder spaces of the actuating cylinder 36 are sealed off. The advantage of this arrangement is more particularly that owing to the absence of rubber-elastic plain or sliding seals it is possible to have a high speed of operation of the piston 37 while simultaneously in the actuated condition, when the cylinder space 41 is under pressure, there is no leakage flow of air. The fluid flowing past the piston 37 during operation moves into the inner cylinder space 47 which is opposite to the first cylinder space 41, and is in communication with the inner cylinder space 47' of the second actuating device 9' via a leakage duct 48. Preferably, the leakage duct 48 is constituted by a gap provided adjacent to the parting plane 2, between the two housing parts 3 and 4 and may furthermore communicate with a leakage discharge opening 49 of the valve housing 1. Furthermore preferably the leakage duct 48 extends adjacent to the parting plane 2 around the valve spool 7 and the receiving means 6 therefor so that it is able to accept and lead off leakage air coming from the valve duct 10 as well. All in all there is therefore a pressure-less valve housing 1 so that the means connecting the housing part do not have to be very strong. Furthermore, no special lateral sealing means for the leakage duct 48 is necessary for preventing leakage towards the outside of the valve, although here it is however expedient to provide seals (not shown) to prevent entry of foreign matter.

Accordingly in the case of the two actuating cylinders 36 it is a question of single acting ones and the piston of the cylinder which is respectively not being actuated is moved back into the starting position by the agency of the intermediately placed spool 7. Between the end surfaces of the valve spools and the end surface of the respective piston 37 or, respectively, its guide head 42 it is sufficient to have touching engagement.

The sealing ring 46 as mentioned above is preferably placed in a recess in the valve housing and in its part which is radially outside the annular head 45 it is acted upon by the end surface of the inserted sleeve-like guide part 48 in a sealing manner. In order to provide support it is possible to provide a support ring 50 of steel between the sealing ring 46 and the housing. The actuating cylinder 36 is preferably held in position within the valve housing 1 by claw-like heads 51, which grasp it from behind axially, of the two housing parts 3 and 4.

In order to provide a stiffening effect adjacent to the passages 22 the valve spool 7 may be provided with stiffening ribs 52 which in FIG. 2 are shown in broken lines only and which span a respective passage 22 in the spool and preferably constitute an integral part of the spool. The direction in which the ribs are aligned preferably coincides with the longitudinal direction 8, it being possible if desired to provide a plurality of ribs 52 alongside each other adjacent to each opening 22.

Figure 7:
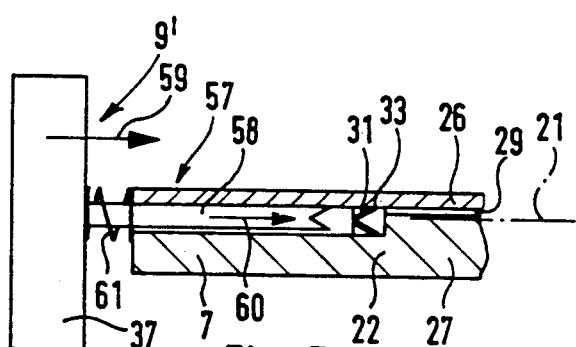
FIG. 7 is a diagrammatic representation of an overriding device for a check valve integrated in the valve spool.

In conjunction with a valve design, in the case of which fluid power medium is able to be supplied to the fluid space 29 via a check valve arrangement, it is possible to have an overriding device 57, which is diagrammatically shown in the FIG. 7 to overcome the checking function and which on switching over the valve between two positions causes an at least temporary venting of the fluid space 29. In accordance with FIG. 7 the overriding device 57 is operated by an actuating piston 57, which is diagrammatically indicated, of the actuating devices 9 and 9'. In this case there is an actuating plunger 58 for instance which extends from the end surface of the spool in the direction 21 of shifting into the valve spool 7 and whose end surface extends as far as the back of one of the sealing elements 31. Its end surface in this case has such a configuration that it is able to fit at least a certain amount externally around a sealing element 31 which is provided with a check sealing lip 33, the latter 33 being bent inwards and lifted clear from the associated spool element 26. The actuating plunger 58 is connected with the actuating piston 37 and when as indicated by the arrow 59 the same is moved towards the valve spool 7, the actuating plunger 58 will move as indicated by the arrow 60 towards the sealing element 31 and lifts the check valve lip 33. Therefore the fluid loading means moves out of the fluid space 29, the loading effect between the valve spool 7 and the valve housing 1 is reduced, and in the case of further movement of the piston a displacement of the spool with a substantially reduced actuating force and with an increased switching rate is possible. A return spring 61 positioned between the actuating piston 37 and the valve spool 7 may ensure that the contact between the actuating plunger 58 and the sealing element 31 is only short and only occurs for instance initially.

FIG. 10 shows a further valve design, in the case of which like parts are denoted by like reference characters. In this case a single-piece valve spool 7 is provided, whose two surfaces 12 and 13 run between support surfaces 24 on the housing. In this case at least the support surfaces 24 cooperating with one spool surface 13 are able to be moved in a direction perpendicular to the direction 21 of shifting of the valve spool 7 and the latter is able to be urged against spool surface 13. The loading force is in this case as well provided by at least one loading means 25, which operates between the respective support element 62 having a support surface 62 and the valve housing. In this embodiment of the invention there is the advantage that there is a single support element 62 having all support surfaces 24 on one side and as a loading means 25 there are spring element 63 or arrangements of springs. However it is possible as well to use a fluid loading means in addition or as an alternative in the manner as mentioned above. This is more particularly the case because in the part between the support element 62 and the valve housing 1 seal elements 67 are in any case necessary which could be used to delimit a fluid space.

Valves with non-fluid power loading means are more particularly an advantage in cases of constant loading on the valve owing to the low-cost design. Furthermore the valve in accordance with FIGS. 1 through 5 may additionally to, or in place of, the fluid loading means be provided with a non-fluid loading means, more particularly in the form of one constituted by a spring arrangement.

The asymmetrically divided valve spool 7 which is preferably used in the embodiments of the invention in accordance with FIGS. 1 through 5 also has the advantage that the supply of the fluid loading means adjacent to the part plane between the two spool elements 26 and 27 leads to a favorable flow onto the check lip 33. The valve in accordance with the invention is able to be readily used with other similar valves to form compact valve arrangements. Furthermore a plurality of the valves may be readily stacked.

Figure 6:
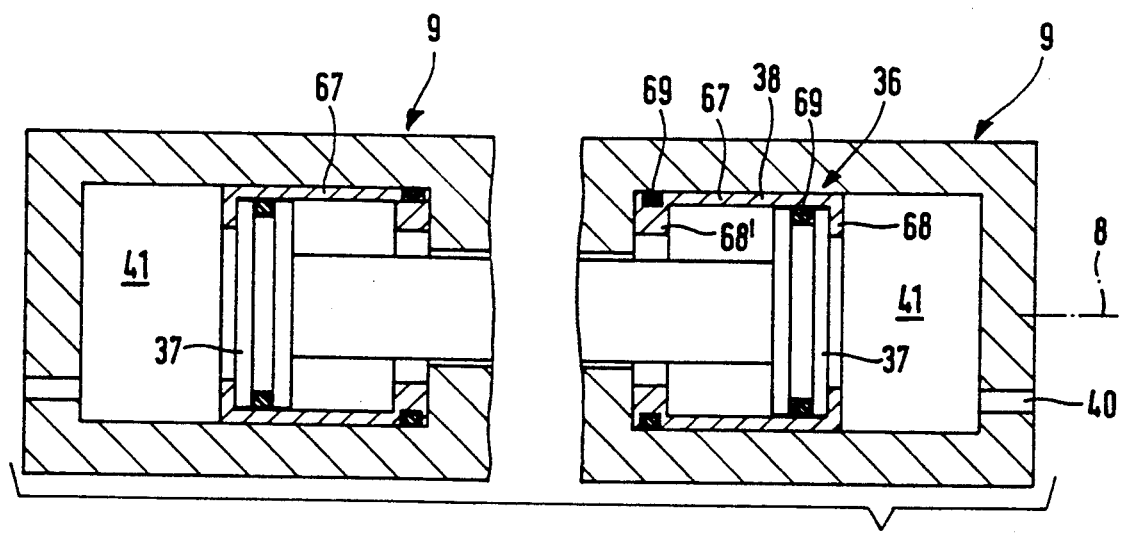
FIG. 6 is a diagrammatic representation of the end parts of a further design of the valve, this time in the form of a pulse valve, with a particularly advantageous form of the actuating cylinders.

Attention will now be turned to FIG. 6 showing a further modification of an actuating device 9 and 9' for a fluid operated spool valve. It is suitable more particularly for use in a valve of the type described in the above. However this type of actuating device is able to be used for any other type of spool valve. It is characterized in that in the case of an arrangement in pairs between the valve spool 7, which is not illustrated in detail, it permits three-position operation with a clearly defined center position.

Owing to the identical design the description of FIG. 6 is only directed to one of the actuating devices 9. It comprises an actuating cylinder 36, with a guide housing or guide part 38, in which a piston 37 is arranged for longitudinal displacement in the direction 8. Between the outer periphery of the actuating piston 37 and the inner periphery of the guide part 38 there is an axially sliding sleeve 67 able to move both in relation to the guide part and also in relation to the piston 37. Radially projecting drive dogs 68 and 68' are formed on the sliding sleeve 67 which extend on both sides of the piston radially inwards and they are preferably in the form of annular projections. The axial distance between the two dogs 68 and 68' is larger than the thickness of the piston and between the sliding sleeve 67 and the piston a relative sliding movement is possible between two end positions in which the piston abuts one or the other dog. Between the piston 37 and the sliding sleeve 67 on the one hand and between the sliding sleeve 67 and the guide part 38 on the other hand there is a respective sealing arrangement 69. The outer cylinder space 41, remote from the opposite actuating device 9', of the actuating device 9, is able to be acted upon by pressure fluid coming in through a connection opening 40. The sliding sleeve 67 is shorter than the cylinder space.

The design of the opposite actuating device 9' is similar so that no further account thereof is necessary.

The workings of the arrangement will now be described. Starting in the first switching position, in which both the sliding sleeve 67 and also the piston 37 of the one actuating device 9' assume the outermost end of stroke position, fluid power medium is fed to the associated outer cylinder space 41. As a result both the piston 37 and also the sliding sleeve 67 move to the right so that firstly the piston of the other actuating device 9 and then, when the latter has struck the outer dog 68, the associated sliding sleeve 67 as well are moved to the right as far as the end of the stroke position. The corresponding course of movement takes place in reverse when the actuating fluid is fed to the actuating device 9.

In this respect it is significant that in the case of the two cylinder spaces 41 being subject to the same operating pressure the center position illustrated in FIG. 6 results. The sum of the pressure forces acting from the outer cylinder 41 on the working surfaces of the sliding sleeve 67, its outer dogs 68 and the facing piston surface is identical on both sides. Assuming that the piston arrangement, which is coupled together by the intermediate spool, were to be moved slightly axially in the one or the other direction from the center position, the result would be an immediate reduction in the effective pressure surface so that the entire system would return back into the equilibrium, central position.

It is in such a manner that it is possible to ensure a precision operation of the three-position valve, in the case of which in a central position all ducts 14 through 18 are shut off and the connected load is in a clearly defined position.

I claim:

1. A spool valve having improved sealing characteristics comprising:
   a valve housing having spool receiving means contained therein, said valve housing further having at least one supply valve duct and at least one discharge valve duct for flow of a fluid power medium, each of said valve ducts communicating with said spool receiving means;
   a valve spool slidably positioned within said spool receiving means and having first and second spool elements positioned adjacent to each other, said spool elements defining a fluid space therebetween, each of said spool elements having at least one opening therethrough, said openings being in fluid communication with each other to form a continuous passage through said valve spool, said passage being substantially perpendicular to the direction of travel of said valve spool such that a power fluid medium may flow from said supply valve duct to said discharge valve duct when said valve spool is in a selected position, said valve spool further having an inner seal positioned between said spool elements and surrounding said passage, said inner seal thereby sealing said passage from said fluid space, said valve spool also having an external seal positioned between said spool elements, said external seal surrounding said inner seal and enclosing said fluid space;
   means for providing a pressurized fluid to said fluid space for forcing said spool elements into sealing contact with said valve housing; and
   actuating means for sliding said valve spool within said valve spool receiving means.

2. The valve according to claim 1, further comprising means for preventing relative movement between said spool elements.

3. The valve according to claim 1, wherein said pressurized fluid is provided to said fluid space independently of the position of said valve spool.

4. The valve according to claim 3, wherein said pressurized fluid is tapped from said fluid power medium.

5. The valve according to claim 4, wherein said pressurized fluid is compressed air.

6. The valve according to claim 1, further comprising a fluid power check positioned in fluid communication between said power fluid medium and said fluid space, said fluid power check valve arranged to allow a flow of said power fluid medium into said fluid space while preventing a flow of said power fluid medium in the opposite direction.

7. The valve according to claim 6, further comprising an overriding device connected to said check valve for temporarily venting said fluid space when said valve spool is slid within said valve spool receiving means.

8. The valve according to claim 7, wherein said overriding device includes a plunger positioned to contact and temporarily interrupt the sealing contact between said external seal and at least one of said spool elements when said valve spool is slid within said valve spool receiving means.

9. The valve accordingly to claim 1, wherein at least one of said seals has a check valve sealing lip.

10. The valve according to claim 9, wherein said seals have one of a substantially U-like cross-section and a substantially V-like cross-section, the opening of said cross-section being turned towards said fluid space.

11. The valve according to claim 1, wherein said actuating means is a cylinder having a slidable piston positioned therein, said piston having an axial head attached to one end, said axial head positioned to contact a sealing ring fixedly attached to said valve housing.

12. The valve according to claim 11, wherein said piston is positioned within an axially sliding sleeve.

13. The valve according to claim 1, wherein said spool passage is spanned by at least one stiffening rib.

14. The valve according to claim 1, further comprising a leakage duct for receiving fluid leaked from said spool receiving means, said leakage duct surrounding said spool receiving means, said leakage duct communicating with a leaked fluid discharge opening in said valve housing.

* * * * *